United States Patent
Berens (10) Patent No.: US 9,225,247 B2
(45) Date of Patent: Dec. 29, 2015

(54) COMPARATOR FOR SYNCHRONOUS RECTIFICATION AND METHOD OF OPERATION

(71) Applicant: Michael T. Berens, Austin, TX (US)

(72) Inventor: Michael T. Berens, Austin, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 122 days.

(21) Appl. No.: 14/230,734

(22) Filed: Mar. 31, 2014

(65) Prior Publication Data

US 2015/0280562 A1 Oct. 1, 2015

(51) Int. Cl.
*H02M 3/156* (2006.01)
*H02M 3/158* (2006.01)
*H03K 5/24* (2006.01)

(52) U.S. Cl.
CPC .................. *H02M 3/158* (2013.01)

(58) Field of Classification Search
CPC ....... H02M 3/156; H03K 5/24; H03K 5/2472; H03K 5/2481; G01R 19/165; G01R 19/16557; G01R 19/16566
USPC ............. 327/56, 62, 65, 72, 77; 323/222, 282
See application file for complete search history.

(56) References Cited

U.S. PATENT DOCUMENTS

| | | | |
|---|---|---|---|
| 6,605,964 B2 * | 8/2003 | Nakada ................ | H03K 5/2481 327/62 |
| 7,936,291 B2 | 5/2011 | Wolf et al. | |
| 8,013,586 B2 | 9/2011 | Tlaskal et al. | |
| 8,441,238 B2 | 5/2013 | Chen et al. | |
| 8,482,270 B2 | 7/2013 | Wrathall | |
| 2007/0279103 A1 * | 12/2007 | Sugai ..................... | H03K 5/249 327/85 |
| 2009/0153199 A1 * | 6/2009 | Kobayashi ............. | H03K 5/082 327/108 |
| 2012/0256658 A1 * | 10/2012 | Nakahara ............... | H03K 17/30 327/81 |

OTHER PUBLICATIONS

Vratislav, Michal, "Inductor Current Zero-Crossing Detector and CCM/DCM Boundary Detector for Integrated High-Current Switched-Mode DC-DC Converters", IEEE Transactions on Power Electronics, vol. PP, Issue 99, Nov. 25, 2013, 8 pages.

* cited by examiner

Primary Examiner — Gary L Laxton (57) ABSTRACT

A boost converter includes a comparator having first and second gain stages that operate in compare and auto-zero modes. The comparator measures voltage drop across a P-channel transistor to determine when current through an inductor reaches zero. When the inductor current reaches zero, the P-channel transistor becomes inactive to prevent a reduction in efficiency caused by allowing negative inductor current to draw current from a load. The comparator is then placed in a low power state. When the comparator is not in a compare mode, the comparator can operate in an auto-zero mode to cancel offset when measuring the input of the comparator.

20 Claims, 4 Drawing Sheets

COMPARATOR FOR SYNCHRONOUS RECTIFICATION AND METHOD OF OPERATION

CROSS-REFERENCE TO RELATED APPLICATION(S)

This application is related to U.S. patent application Ser. No. 14/230,710, filed on even date, entitled "Comparator for Synchronous Rectification and Method of Operation," naming Michael Berens as inventor, and assigned to the current assignee hereof.

BACKGROUND

1. Field

This disclosure relates generally to integrated circuits, and more specifically, to a comparator for synchronous rectification.

2. Related Art

In many circuit applications, DC to DC converters are used to convert an input DC voltage to an output DC voltage. A buck converter is a converter in which the output DC voltage is lower than the input DC voltage, and a boost converter is a converter in which the output DC voltage is greater than the input DC voltage. Buck and booster converters provide the output voltage by controlling current in an inductor controlled by two switches (typically a transistor and a diode). In the case of a buck or boost converter implementing synchronous rectification, diode is replaced by a second switch (typically, a second transistor). The use of a second switch rather than a diode allows for more efficient operation by avoiding the losses from the voltage drop across the diode.

In applications with highly variable loads, it is desirable to prevent reverse current in the inductor. Negative inductor current significantly reduces the efficiency of the converter. Therefore, a need exists for circuitry capable of sensing when the inductor current of a buck or boost converter reaches zero.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, a comparator is used to provide synchronous rectification in a buck/boost converter. In order to prevent negative inductor current in a buck/boost converter, the comparator measures drain/source voltage drop across a low-side NMOS transistor (in the case of a buck converter) or a high-side PMOS transistor (in the case of a boost converter). When the inductor current reaches zero, as indicated by the comparator, the NMOS or PMOS transistor is shut off to prevent the efficiency reduction which would be caused by allowing negative inductor current to draw current from the load. The comparator works an auto-zero phase and a compare phase. During the auto-zero phase, the offset mismatch between inputs of the comparator is stored. This allows for improved zero current detection during the compare phase.

Figure 1:
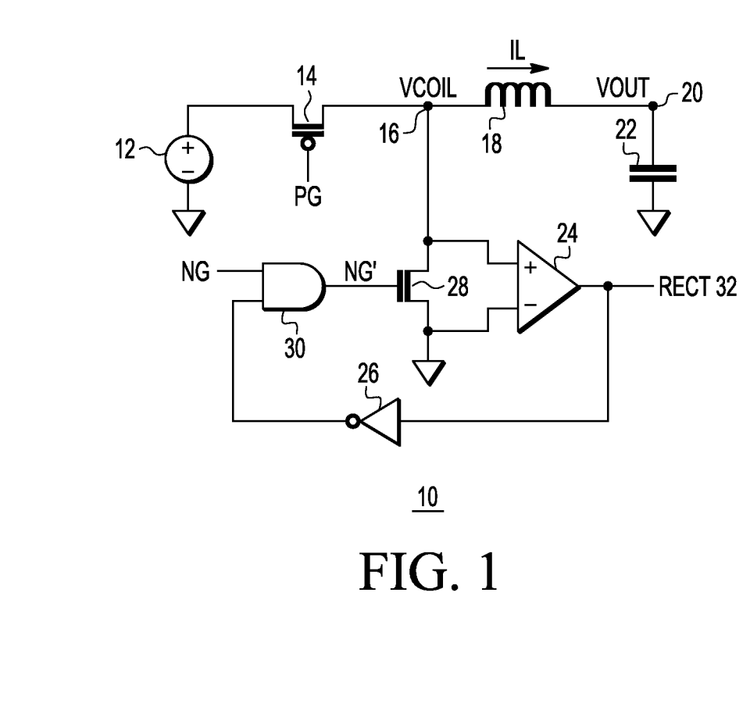
FIG. 1 illustrates, in schematic form, a buck converter having a comparator in accordance with one embodiment of the present invention.

FIG. 1 illustrates, in schematic form, a buck converter 10 (also referred to as a buck DC-DC buck converter) in accordance with one embodiment of the present invention. Converter 10 includes a voltage source 12, a PMOS transistor 14, an inductor 18, an NMOS transistor 28, a capacitor 22, a comparator 24, an inverter 26, and an AND gate 30. Voltage source 12 corresponds to the input DC voltage of converter 10 (in which the node at the positive terminal of voltage source 12 may be referred to as Vin) and the output DC voltage, Vout, is provided at a circuit node 20. Note that a load, not shown, may be coupled to Vout at node 20 of converter 10. A negative terminal of voltage source 12 is coupled to ground and a positive terminal of voltage source 12 is coupled to a first current electrode of transistor 14. A control electrode of transistor 14 is coupled to receive a control signal PG (also referred to as a P-gate signal), and a second current electrode of transistor 14 is coupled to a circuit node 16, which is also referred to as Vcoil and represents the voltage at a first terminal of inductor 18. A first terminal of inductor 18 is coupled to node 16 and a second terminal of inductor 18 is coupled to node 20. Capacitor 22 has a first terminal coupled to node 20 and a second node coupled to ground. A first current electrode of transistor 28 is coupled to node 16 and to a positive input of comparator 24. A second current electrode of transistor 28 is coupled to ground and to a negative input of comparator 24. A control electrode of transistor 28 is coupled to receive an output of AND gate 30, also referred to as NG' (which may also be referred to as an N-gate prime signal). A first input of AND gate 30 is coupled to receive a control signal NG (which may also be referred to as an N-gate signal), and a second input of AND gate 30 is coupled to an output of inverter 26. Comparator 24 provides a signal RECT 32 at its output which is coupled to an input of inverter 26.

In operation, converter 10 provides Vout based on voltage source 12 in which Vout is less than voltage source 12. Note that control signals PG and NG are provided such that their duty cycles control the value of Vout. In one embodiment, Vout can be used as feedback to generate or modify PG and NG as needed. Also, PGB (also referred to as a complementary P-gate signal) is the inverse (i.e. complement) of PG. Comparator 24 monitors the drain/source voltage across transistor 28 and when the current through inductor 18 reaches zero, comparator 24 asserts RECT 32 to a logic level one which, by way of inverter 26 and AND gate 30, results in NG' going to a logic level zero, thus turning off transistor 28. This prevents inductor 18 from having a negative current drawing current from the load.

Figure 2:
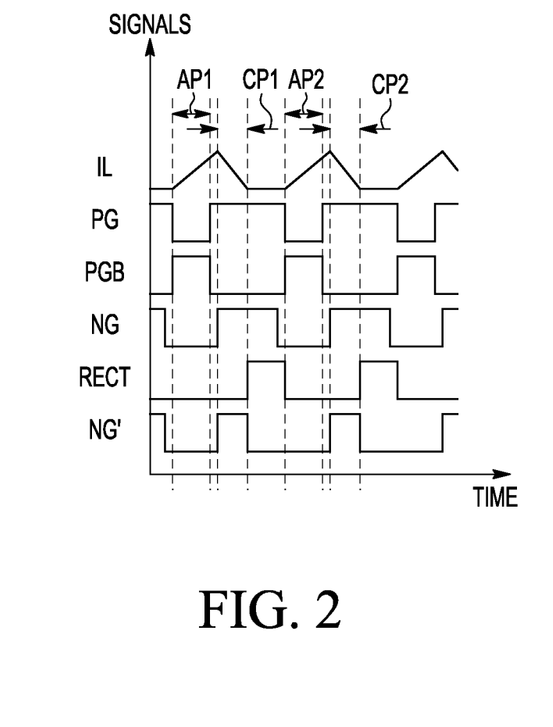
FIG. 2 illustrates a timing diagram of various signals of the buck converter of FIG. 1 in accordance with one embodiment of the present invention.

Operation will be described in further detail in combination with the timing diagram of FIG. 2. FIG. 2 illustrates various signals of converter 10 during a first auto-zero phase, AP1, a second auto-zero phase, AP2, a first compare phase, CP1, and a second compare phase, CP2. As seen in FIG. 2, AP1 begins with the negation of PG to a logic level zero (which results in PGB being a logic level one). Prior to negation of PG, NG has been negated to ensure that transistor 28 is off. Therefore, in AP1, transistor 14 is turned on and transistor 28 is turned off, by way of AND gate 30. During this phase, current through inductor 18 to capacitor 22 increases. Once current through inductor 18 reaches an upper current limit, PG is asserted, thus turning off transistor 14. Soon after PG is asserted, NG is asserted, thus starting CP1. At this point, RECT 32 is still a logic level zero, therefore NG' is a logic level one thus turning on transistor 28. During this phase, inductor 18 discharges its stored energy to the load. Comparator 24 monitors the voltage across transistor 28, and when the current through inductor 18 reaches zero, comparator 24 asserts RECT 32. Assertion of RECT 32 results in NG' going to a logic level zero, thus turning off transistor 28. This ends CP1. Note that if the current through inductor 18 never reaches zero but reaches a lower current limit before reaching zero, RECT 32 would not have been asserted, and, at that point, NG would again be deasserted (which would indicate the end of CP1 rather than the assertion of RECT 32). Subsequently, PG would again be negated to start AP2. AP2 and CP2 operate in a similar manner to AP1 and CP1.

Note that PG and NG are non-overlapping signals. That is, PG is asserted to turn off transistor 14 prior to NG being asserted to turn on transistor 28. Also, NG is negated to turn off transistor 14 prior to PG being negated to turn transistor 14 back on. The duty cycles of PG and NG control the current through inductor 18 which allow for Vout to remain at a steady level that is less than Vin. Furthermore, comparator 24 asserts RECT 32 when the current through inductor 18 reaches zero so as to prevent negative inductor current. (Details of comparator 24 will be described in further detail below with respect to FIG. 3.) Note that the negative inductor current would pull current from the load, thus resulting in significant inefficiencies. Therefore, by preventing negative inductor current, improved efficiency can be achieved.

Figure 3:
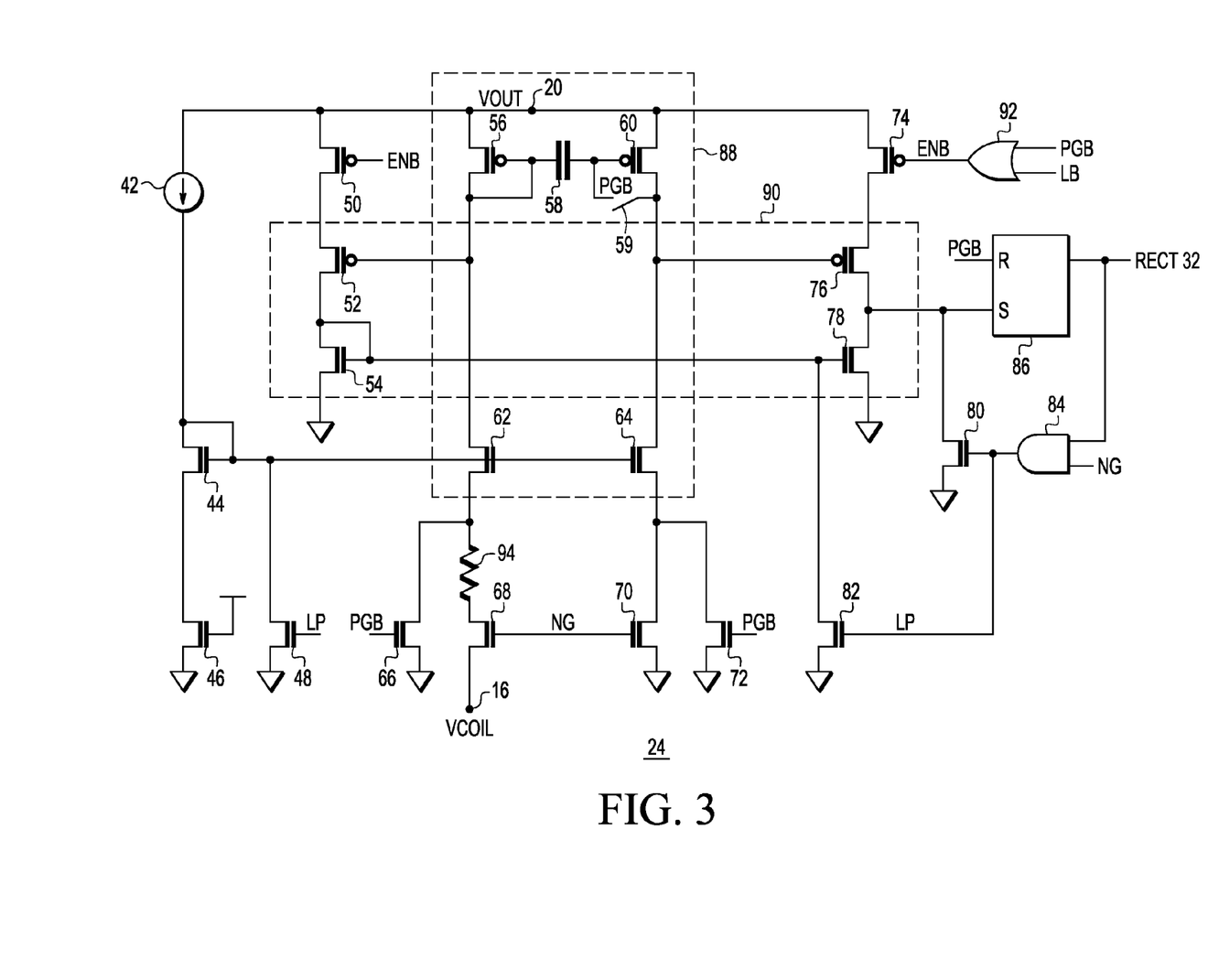
FIG. 3 illustrates, in schematic form, the comparator of the buck converter in further detail, in accordance with one embodiment of the present invention.

FIG. 3 illustrates, in schematic form, further details of comparator 24 of FIG. 1. Comparator 24 includes PMOS transistors 50, 52, 56, 60, 74, 76, resistor 94, capacitor 58, NMOS transistors 44, 46, 48, 54, 66, 68, 62, 64, 70, 72, 82, 78, 80, a set-reset (SR) latch 86, OR gate 92, AND gate 84, current source 42, and a switch 59. A first terminal of current source 42 is coupled to node 20, and second terminal of current source 42 is coupled to a first current electrode of transistor 44. A control electrode of transistor 44 is coupled to the first current electrode of transistor 44, and a second current electrode of transistor 44 is coupled to a first current electrode of transistor 46. A control electrode of transistor 46 is coupled to node 20, and a second current electrode of transistor 46 is coupled to ground. A first current electrode of transistor 48 is coupled to the control electrode of transistor 44, a gate electrode of transistor 48 is coupled to receive LP (also referred to as a low power signal), and a second current electrode is coupled to ground. A first current electrode of transistor 50 is coupled to node 20, a control electrode of transistor 50 is coupled to receive a signal ENB (which is the inverse or complement of the enable signal, EN), and a second current electrode of transistor 50 is coupled to a first current electrode of transistor 52. A second current electrode of transistor 52 is coupled to a first current electrode of transistor 54. A control electrode of transistor 54 is coupled to the first current electrode of transistor 54, and a second current electrode of transistor 54 is coupled to ground.

A first current electrode of transistor 56 is coupled to node 20, a control electrode of transistor 56 is coupled to a second current electrode of transistor 56 and a first terminal of capacitor 58. The second current electrode of transistor 56 is coupled to the control electrode of transistor 52 and to a first current electrode of transistor 62. A second current electrode of transistor 62 is coupled to a first current electrode of transistor 66 and a first terminal of resistor 94. A second current electrode of transistor 66 is coupled to ground, and a control electrode of transistor 66 is coupled to receive PGB. A second terminal of resistor 94 is coupled to a first current electrode of transistor 68, a control electrode of transistor 68 is coupled to receive NG, and a second current electrode of transistor 68 is coupled to node 16. A first current electrode of transistor 60 is coupled to node 20, a control electrode of transistor 60 is coupled to a second terminal of capacitor 58 and a first signal terminal of switch 59. A second signal terminal of switch 59 is coupled to the second current electrode of transistor 60. A control input of switch 59 is coupled to receive PGB. The second current electrode of transistor 60 is coupled to a first current electrode of transistor 64, a control electrode of transistor 64 is coupled to a control electrode of transistor 62, and a second current electrode of transistor 64 is coupled to a first current electrode of transistor 70 and a first current electrode of transistor 72. A second control electrode of transistor 70 is coupled to ground, and a control electrode of transistor 70 is coupled to receive NG. A second control electrode of transistor 72 is coupled to ground, and a control electrode of transistor 72 is coupled to receive PGB.

A first current electrode of transistor 74 is coupled to node 20, a control electrode of transistor 74 is coupled to an output of OR gate 92 which provides ENB, and a second current electrode of transistor 74 is coupled to a first current electrode of transistor 76. A control electrode of transistor 76 is coupled to the second current electrode of transistor 60, and a second current electrode of transistor 76 is coupled to a first current electrode of transistor 78. A control electrode of transistor 78 is coupled to the control electrode of transistor 54 and to a first current electrode of transistor 82. A second current electrode of transistor 78 is coupled to ground. A second current electrode of transistor 82 is coupled to ground, and a control electrode of transistor 82 is coupled to an output of AND gate 84 which provides LP. A first current electrode of transistor 80 is coupled to a first current electrode of transistor 78 and to a set input (S) of SR latch 86, a control electrode of transistor 80 is coupled to the output of AND gate 84, and a second current electrode of transistor 80 is coupled to ground. A reset input (R) of SR latch 86 is coupled to receive PGB, and an output of SR latch 86 is coupled to provide RECT 32 and is coupled to a first input of AND gate 84. A second input of AND gate 84 is coupled to receive NG.

Comparator 24 includes a first gain stage 88 which includes transistors 56, 60, 62, and 64, switch 59, and capacitor 58, and a second gain stage 90 which includes transistors 52, 54, 76, and 78. Transistors 62 and 64 are current mirrors from transistor 44. Therefore transistor 46 is a dummy device that imitates transistors 68 and 70 for the implementation of the current mirror. Note that SR latch 86 operates such that when the R input is asserted to a logic level one, the output of SR latch 86 becomes a logic level zero, and when the S input is asserted to a logic level one, the output of SR latch 86 becomes a logic level one. If both the S and R inputs are asserted, priority goes to the S input such that output of SR latch 86 becomes a logic level one.

In operation, during the auto-zero phase (such as AP1 which was described above in reference to FIGS. 1 and 2), PG is a logic level zero, PGB is a logic level one, and NG is a logic level zero. So as described above with respect to converter 10, transistor 14 is on, transistor 38 is off, and current is increasing through inductor 18. Referring to the schematic of comparator 24 of FIG. 3, both transistors 66 and 72 are on, and transistors 68 and 70 are off. In this manner, the positive and negative inputs to comparator 24 are equal because they are both set to ground. Also, since PGB is a logic level one, switch 59 is closed, connecting the control electrode of transistor 60 to the second current electrode of transistor 60 thus diode-connecting transistor 60 during the auto-zero phase. Therefore, during the auto-zero phase, there is a fixed current through transistors 56 and 62 and through transistors 60 and 64. These currents ideally match; however, transistor mismatch will cause them to slightly differ from each other. Any mismatch in current, though, will get stored as a voltage on capacitor 58 due to diode-connected transistor 60.

During the auto-zero phase, transistors 50 and 74 are both also off due to PGB at the first input of OR gate 92 being a logic level one, thus causing ENB to be a logic level one. Transistors 74 and 50 being off allow for low power operation by preventing current flow in second gain stage 90 of comparator 24. Also, the output of latch 86 is a logic level zero making RECT 32 a logic level 0. This results in LP being a logic level zero, thus keeping transistors 80, 83, and 48 off. Transistors 82 and 48 being off allows for auto-zero operation by not grounding the bias voltages of current source transistors 44 and 54.

During the compare phase (such as CP1 which was described above in reference to FIGS. 1 and 2), NG is a logic level one. Note that prior to NG transitioning to a logic level one to begin the compare phase, PG is transitioned to a logic one, thus ending the previous auto-zero phase. Therefore, as described above with respect to converter 10, transistor 14 is off, transistor 38 is on, and current through inductor 18 is decreasing. Referring to the schematic of comparator 24 of FIG. 3, switch 59 is now open, transistors 66 and 72 are now off, and transistors 68 and 70 are on. In this manner, the positive input of comparator 24 is coupled to node 16 and the negative input of comparator 24 is coupled to ground. Therefore, comparator 24 compares the voltage at node 16 (Vcoil) with ground to determine when Vcoil reaches zero. That is, as current through inductor 18 decreases, Vcoil will be decreasing. When Vcoil goes below ground, the control electrode of transistor 76 is pulled low, thus turning on transistor 76, and the control electrode of transistor 52 is pulled high, thus turning off transistor 52. The current feeds back through transistor 78 causing transistor 78 to become weaker while transistor 76 becomes stronger. In this manner, the S input to SR latch 86 is pulled to a logic level one causing RECT 32 to be asserted to a logic level one. Since RECT 32 and NG are both logic level ones, LP is also asserted to a logic level one which turns on transistor 80. This pulls the S input of SR latch 86 back to a logic level zero in preparation for the next auto-zero phase. RECT 32 going to a logic level one indicates that the compare function is done. Upon completion of the compare function, comparator 24 is placed in low power until the next auto-zero phase. For example, with LP being a logic level one as a result of RECT 32 being a logic level one, transistors 48 and 82 are turned on which results in turning off transistors 44, 62, 64, 54, and 78 to reduce power. Note that had comparator 24 not detected Vcoil reaching zero, RECT 32 would not have been asserted and the compare function would have ended upon NG being transitioned to a logic level low in preparation for the next auto-zero phase.

Resistor 94 may or may not be present in the comparator 24. If present, resistor 94 may introduce an intentional offset to so as to assert RECT 32 before the current through inductor 18 goes negative. That is, resistor 94 may counter any delay in comparator 24. If comparator 24 operates fast enough, the current in inductor 18 will not go significantly negative and resistor 94 may not be needed. Also, note that the presence of capacitor 58, which stored the mismatch current during the previous auto-zero phase, allows for a more accurate comparison operation during the subsequent compare phase.

Figure 4:
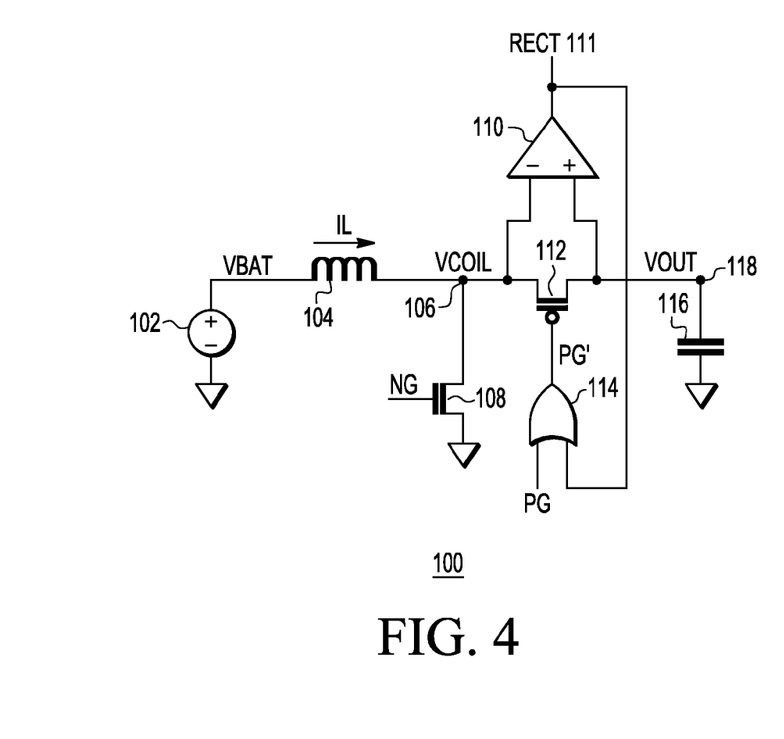
FIG. 4 illustrates, in schematic form, a boost converter having a comparator in accordance with one embodiment of the present invention.

FIG. 4 illustrates, in schematic form, a boost converter 100 (also referred to as a buck DC-DC boost converter) in accordance with one embodiment of the present invention. Converter 100 includes a voltage source 102, an inductor 104, an NMOS transistor 108, a PMOS transistor 112, a capacitor 116, a comparator 110, and an OR gate 114. Voltage source 102 corresponds to the input DC voltage of converter 100 (in which the node at the positive terminal of voltage source 102 may be referred to as Vin) and the output DC voltage, Vout, is provided at a circuit node 118. Note that a load, not shown, may be coupled to Vout at node 118 of converter 100. A negative terminal of voltage source 102 is coupled to ground and a positive terminal of voltage source 102 is coupled to a first terminal of inductor 104, and a second terminal of inductor 104 is coupled to a circuitry node 106, which is also referred to as Vcoil and represents the voltage at the second terminal of inductor 104. A first current electrode of transistor 108 is coupled to node 106, a control electrode of transistor 108 is coupled to receive control signal NG (also referred to as an N-gate signal), and a second current electrode of transistor 108 is coupled to ground. A first current electrode of transistor 112 is coupled to node 106 and a negative input of comparator 110, a control electrode of transistor 112 is coupled to receive an output of OR gate 114, also referred to as PG' (also referred to as a P-gate prime signal), and a second current electrode of transistor 112 is coupled to a positive input of comparator 110 and circuit node 118. A first terminal of capacitor 116 is coupled to node 118, and a second terminal of capacitor 116 is coupled to ground. A first input of OR gate 114 is coupled to receive PG (also referred to as a P-gate signal), and a second input of OR gate 114 is coupled to receive an output of comparator 110, which provides the output signal RECT 111.

In operation, converter 100 provides Vout based on voltage source 102 in which Vout is greater than voltage source 102. Note that control signals PG and NG are provided in a manner similar to as described above in reference to the buck converter in which their duty cycles control the value of Vout. In one embodiment, Vout can be used as feedback to generate or modify PG and NG as needed. Also, PGB (also referred to as a complementary P-gate signal) is the inverse (i.e. complement) of PG, and NGB (also referred to as a complementary N-gate signal) is the inverse (i.e. complement) of NG. Comparator 110 monitors the drain/source voltage across transistor 112 and when the current through inductor 104 reaches zero, comparator 110 asserts RECT 111 to a logic level one which, by way of OR gate 114, results in PG' going to a logic level one, thus turning off transistor 112. This prevents inductor 104 from having a negative current drawing current from the load.

Figure 5:
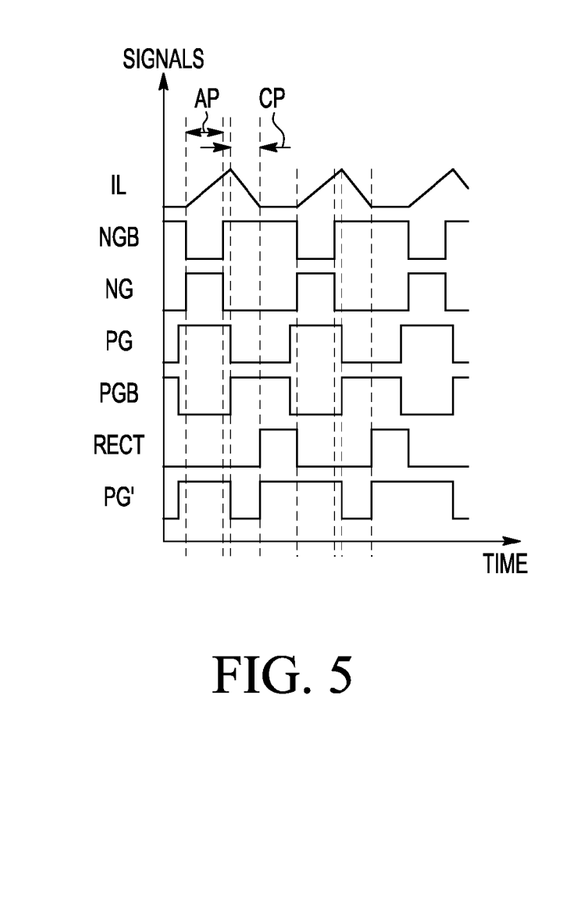
FIG. 5 illustrates a timing diagram of various signals of the boost converter of FIG. 4 in accordance with one embodiment of the present invention.

Operation will be described in further detail in combination with the timing diagram of FIG. 5. FIG. 5 illustrates various signals of converter 100 during an auto-zero phase, AP, and a compare phase, CP. As seen in FIG. 5, AP begins with the assertion of NG to a logic level one (which results in NGB being a logic level zero). Prior to assertion of NG to a logic level one, PG has been asserted to a logic level one to ensure that transistor 112 is off. Therefore, during AP, transistor 104 is turned on and transistor 112 is turned off, by way of OR gate 114. During this phase, current through inductor 104 and transistor 108 to ground increases. Once current through inductor 104 reaches an upper current limit, NG is deasserted to a logic level zero, thus turning off transistor 108. Soon after NG is negated, PG is negated, thus starting CP. At this point, RECT 111 is still a logic level zero, therefore PG' is a logic level zero thus turning on transistor 112. During this phase, inductor 104 discharges its stored energy to the load. Comparator 110 monitors the voltage across transistor 112, and when the current through inductor 104 reaches zero, comparator 110 asserts RECT 111. Assertion of RECT 11 results in PG' going to a logic level one, thus turning off transistor 112. This ends CP. Note that if the current through inductor 104 never reaches zero but reaches a lower current limit before reaching zero, RECT 11 would not have been asserted, and, at that point, PG would again be asserted (which would indicate the end of CP rather than the assertion of RECT 111). Subsequently, NG would again be asserted to start the next auto-zero phase.

Note that, as with the buck converter, PG and NG are non-overlapping signals. That is, NG is negated to turn off transistor 108 before negation of PG to turn on transistor 112. Also, PG is asserted to turn off transistor 112 prior to NG being asserted to turn transistor 108 back on. The duty cycles of PG and NG control the current through inductor 104 which allow for Vout to remain at a steady level that is greater than Vin. Furthermore, comparator 110 asserts RECT 111 when the current through inductor 104 reaches zero so as to prevent negative inductor current. (Details of comparator 110 will be described in further detail below with respect to FIG. 6.) Note that the negative inductor current would pull current from the load, thus resulting in significant inefficiencies. Therefore, by preventing negative inductor current, improved efficiency can be achieved.

Figure 6:
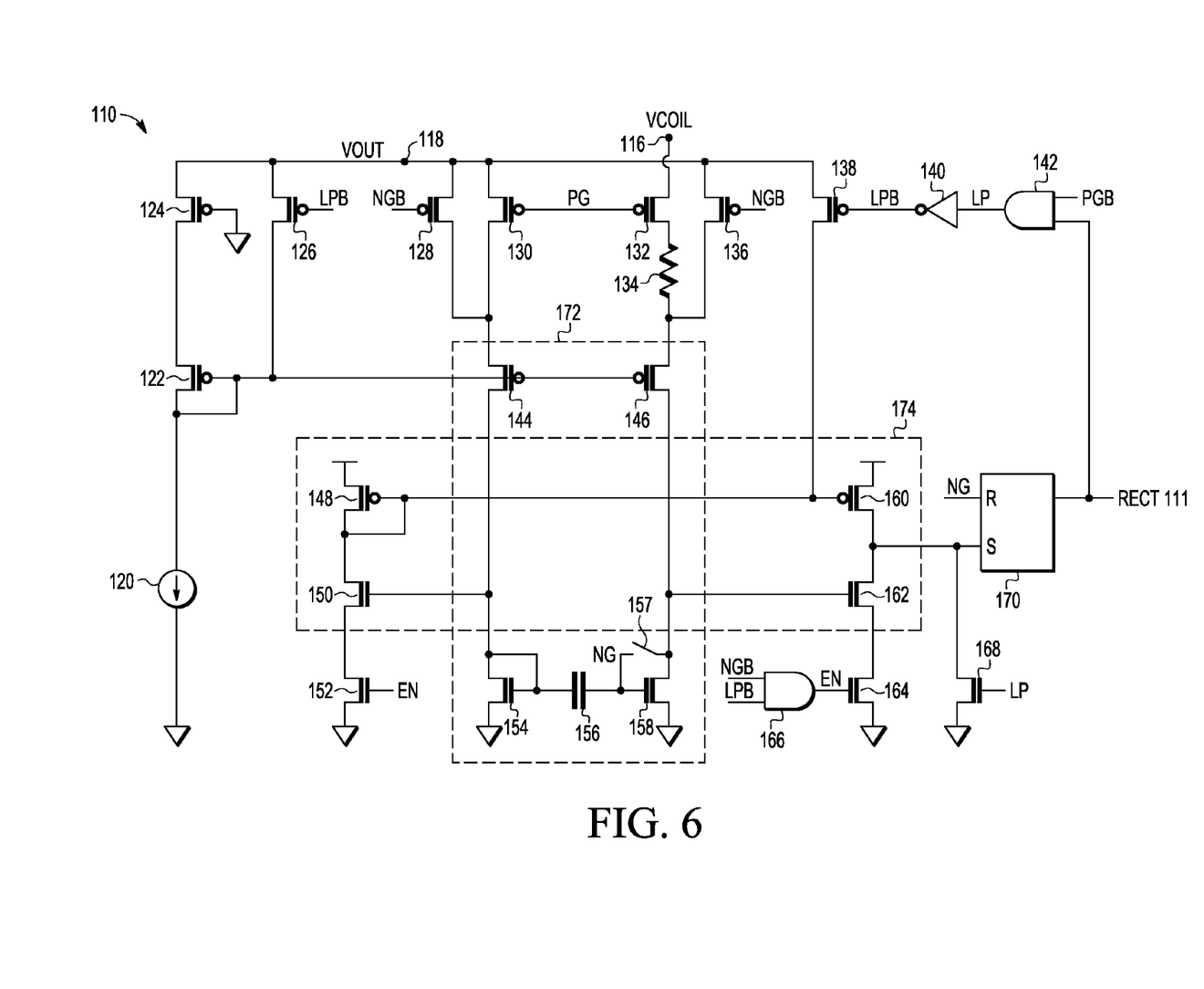
FIG. 6 illustrates, in schematic form, the comparator of the boost converter in further detail, in accordance with one embodiment of the present invention.

FIG. 6 illustrates, in schematic form, further details of comparator 110 of FIG. 4. Comparator 110 includes PMOS transistors 124, 122, 126, 128, 130, 132, 136, 138, 144, 146, 148, and 160, resistor 134, capacitor 156, NMOS transistors 144, 146, 150, 152, 154, 158, 162, 164, and 168, a set-reset (SR) latch 170, inverter 140, AND gates 142 and 166, current source 120, and a switch 157. A first current electrode of transistor 124 is coupled to node 118, a control electrode of transistor 124 is coupled to ground, and a second current electrode of transistor 124 is coupled to a first current electrode of transistor 122. A second current electrode of transistor 122 is coupled to a control electrode of transistor 122 and a first current terminal of current source 120. A second terminal of current source 120 is coupled to ground. A first current electrode of transistor 126 is coupled to node 118, a control electrode of transistor 126 is coupled to receive LPB (which is the inverse of LP, in which LP may be referred to as a low power signal), and a second current electrode is coupled to the control electrode of transistor 122.

A first current electrode of transistor 128 is coupled to node 118, a control electrode of transistor 128 is coupled to receive NGB. A first current electrode of transistor 130 is coupled to node 118, a control electrode of transistor 130 is coupled to receive PG, and a second current electrode of transistor 130 is coupled to the second current electrode of transistor 128 and a first current electrode of transistor 144. A control electrode of transistor 144 is coupled to the control electrode of transistor 122. A second current electrode of transistor 144 is coupled to a first current electrode of transistor 154. A control electrode of transistor 154 is coupled to the first current electrode of transistor 154 and to a first terminal of capacitor 156, and a second current electrode of transistor 154 is coupled to ground. A first current electrode of transistor 148 is coupled to Vout (node 118), a control electrode of transistor 148 is coupled to a second current electrode of transistor 148. The second current electrode of transistor 148 is coupled to a first current electrode of transistor 150. A control electrode of transistor 150 is coupled to the first current electrode of transistor 154, and a second current electrode of transistor 150 is coupled to a first current electrode of transistor 152. A control electrode of transistor 152 is coupled to receive an enable signal, EN, and a second current electrode of transistor 152 is coupled to ground.

A first current electrode of transistor 132 is coupled to node 116, a control electrode of transistor 132 is coupled to receive PG, and a second current electrode of transistor 132 is coupled to a first terminal of resistor 134. A second terminal of resistor 134 is coupled to a first current electrode of transistor 146. A control electrode of transistor 146 is coupled to a control electrode of transistor 144. A first current electrode of transistor 136 is coupled to node 118, a control electrode of transistor 136 is coupled to receive NGB, and a second current electrode of transistor 136 is coupled to the first current electrode of transistor 146. A second current electrode of transistor 146 is coupled to a first current electrode of transistor 158 and a first signal terminal of switch 157. A control electrode of transistor 158 is coupled to a second signal terminal of switch 157 and a second terminal of capacitor 156. A second current electrode of transistor 158 is coupled to ground.

A first current electrode of transistor 138 is coupled to node 116, a control electrode of transistor 138 is coupled to an output of inverter 140 to receive LPB. An input of inverter 140 is coupled to receive LP from an output of AND gate 142. A first input of AND gate 142 is coupled to receive PGB and a second input of AND gate 142 is coupled to the output of SR latch 170 to receive RECT 111. A first current electrode of transistor 160 is coupled to Vout (node 118), a control electrode of transistor 160 is coupled to the second current electrode of transistor 138 and the control electrode of transistor 148. A second current electrode of transistor 160 is coupled to a set input (S) of SR latch 170 and a first current electrode of transistor 162. A control electrode of transistor 162 is coupled to the first current electrode of transistor 158. A second current electrode of transistor 162 is coupled to a first current electrode of transistor 164. A control electrode of transistor 164 is coupled to an output of AND gate 166 to receive EN. A second current electrode of transistor 164 is coupled to ground. A first input of AND gate 166 is coupled to receive NGB, and a second input of AND gate 166 is coupled to receive LPB. A reset input (R) of SR latch 170 is coupled to receive NG. A first current electrode of transistor 168 is coupled to the S input of SR latch 170, a control electrode of transistor 168 is coupled to receive LP, and a second current electrode of transistor 168 is coupled to ground.

Comparator 110 includes a first gain stage 172 which includes transistors 144, 146, 154, and 158, switch 157, and capacitor 156, and a second gain stage 174 which includes transistors 148, 160, 150, and 162. Transistors 144 and 146 are current mirrors from transistor 122. Therefore transistor 124 is a dummy device that imitates transistors 130 and 132 for the implementation of the current mirror. Note that SR latch 170 operates such that when the R input is asserted to a logic level one, the output of SR latch 170 becomes a logic level zero, and when the S input is asserted to a logic level one, the output of SR latch 170 becomes a logic level one. If both the S and R inputs are asserted, priority goes to the S input such that output of SR latch 170 becomes a logic level one.

In operation, during the auto-zero phase (such as AP which was described above in reference to FIGS. 4 and 5), NGB is a logic level zero, NG is a logic level one, PG is a logic level one, and PGB is a logic level zero. So as described above with respect to converter 100, transistor 108 is on, transistor 112 is off, and current is increasing through inductor 104. Referring to the schematic of comparator 110 of FIG. 6, both transistors 128 and 136 are on, and transistors 130 and 132 are off. In this manner, the positive and negative inputs to comparator 110 are equal because they are both set to Vout. Also, since NG is a logic level one, switch 157 is closed, connecting the control electrode of transistor 158 to the second current electrode of transistor 158 thus diode-connecting transistor 158 during the auto-zero phase. Therefore, during the auto-zero phase, there is a fixed current through transistors 144 and 154 and through transistors 146 and 158. These currents ideally match; however, transistor mismatch will cause them to slightly differ from each other. Any mismatch in current, though, will get stored as a voltage onto capacitor 156 due to diode-connected transistor 158.

During the auto-zero phase, transistors 152 and 164 are both also off due to NGB at the first input of AND gate 166 being a logic level zero, thus causing EN to be a logic level zero. Transistors 152 and 164 being off allows for low power operation by preventing current flow in second gain stage 174 of comparator 110. Also, the output of latch 150 is a logic level zero making RECT 111 a logic level 0. This results in LP being a logic level zero, and thus LPB being a logic level one, and thus keeping transistors 138, 126, and 168 off. Keeping transistors 138 and 126 off allows for auto-zero operation by not pulling the bias voltages of current source transistors 122 and 148 to the Vout level.

During the compare phase (such as CP which was described above in reference to FIGS. 4 and 5), PG is a logic level zero. Note that prior to PG transitioning to a logic level zero to begin the compare phase, NG is transitioned to a logic zero, thus ending the previous auto-zero phase. Therefore, as described above with respect to converter 100, transistor 108 is off, transistor 112 is on, and current through inductor 104 is decreasing. Referring to the schematic of comparator 110 of FIG. 6, switch 157 is now open, transistors 128 and 136 are now off, and transistors 130 and 132 are on. In this manner, the positive input of comparator 110 is coupled to node 118 (Vout) and the negative input of comparator 110 is coupled to node 116 (Vcoil). Therefore, comparator 110 compares the voltage at node 16 (Vcoil) with Vout to determine when Vcoil reaches Vout. That is, as current through inductor 104 decreases, Vcoil will be decreasing. When Vcoil goes below Vout, the control electrode of transistor 162 is pulled low, thus turning off transistor 162, and the control electrode of transistor 150 gets pulled high, thus turning on transistor 150. The current feeds back through transistor 160 causing transistor 160 to become stronger while transistor 162 becomes weaker. In this manner, the S input to SR latch 170 is pulled to a logic level one causing RECT 111 to be asserted to a logic level one. Since RECT 111 and PGB are both logic level ones, LP is also asserted to a logic level one. Therefore, transistor 168 is turned on. This pulls the S input of SR latch 170 back to a logic level zero in preparation for the next auto-zero phase. RECT 111 going to a logic level one indicates that the compare function is done. Upon completion of the compare function, comparator 110 is placed in low power until the next auto-zero phase. For example, with LPB being a logic level zero as a result of RECT 111 being a logic level one, transistors 138 and 126 are turned on which results in turning off transistors 122, 144, 146, 148, and 160 to reduce power.

Resistor 134 may or may not be present in the comparator 110. If present, resistor 134 may introduce an intentional offset to so as to assert RECT 111 before the current through inductor 104 goes negative. That is, resistor 134 may counter any delay in comparator 110. If comparator 110 operates fast enough, the current in inductor 104 will not go significantly negative and resistor 134 may not be needed. Also, note that the presence of capacitor 156, which stored the mismatch current during the previous auto-zero phase, allows for a more accurate comparison operation during the subsequent compare phase.

Therefore, by now it can be understood that there has been provided a buck or boost converter having a comparator which provides synchronous rectification and prevents negative inductor current. When the inductor current reaches zero, as indicated by the comparator, the NMOS or PMOS transistors of the converter is shut off to prevent reduction in efficiency. Furthermore, the comparator operates in an auto-zero phase and a comparison phase, in which an offset between inputs of the comparator may be stored during the auto-zero phase to allow for improved operation in the comparison phase.

As used herein, a first current electrode of a transistor may refer to the source or the drain of the transistor and the second current electrode of the transistor may refer to the other of the source or drain of the transistor. Also, the control electrode may also be referred to as the control gate. Also a PMOS transistor may be referred to as a P-channel transistor and an NMOS transistor may be referred to as an N-channel transistor.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or a "b" following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, different logic gates or combination of gates may be used to generate the various control signals. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In accordance with one embodiment, a boost converter includes comparator having: a first and second N-channel transistors, a source of the first and second N-channel transistors coupled to ground, a drain of the first and second N-channel transistors coupled to a respective control gate of the first and second N-channel transistors; a switch connected between the drain and the control gate of the second N-channel transistor and operated by a N-gate signal, a first P-channel transistor having a drain coupled to the drain of the second N-channel transistor and a source coupled to a drain of a third P-channel transistor and a drain of a fourth P-channel transistor, the third P-channel transistor includes a control gate coupled to a complimentary N-gate signal, and a source coupled to an output voltage of the converter, the fourth P-channel transistor includes a control gate coupled to a P-gate signal, and a source coupled to a coil voltage, a second P-channel transistor having a drain coupled to the drain of the first N-channel transistor and a source coupled to a drain of a fifth P-channel transistor and a drain of a sixth P-channel transistor, the fifth P-channel transistor includes a control gate coupled to the P-gate signal, and a source coupled to the VOUT of the converter, and the sixth P-channel transistor includes a control gate coupled to the complimentary N-gate signal, and a source coupled to the VOUT of the converter. In a further embodiment of the above embodiment, the converter further includes a capacitor coupled between the control gates of the first and second N-channel transistors. In another further embodiment of the above embodiment, the converter further includes a first resistor coupled between the source of the first P-channel transistor and the drain of the fourth P-channel transistor. In another further embodiment of the above embodiment, the converter further includes an inductor having a first terminal coupled to a first node (106), the coil voltage being measurable at the first node; a first switch having a control terminal coupled to a P-gate prime signal, a first terminal coupled to the first node, and a second terminal coupled to the VOUT; the comparator having an inverting input coupled to the first terminal of the first switch and a non-inverting input coupled to the second terminal of the first switch; the P-gate prime signal being set based on an output voltage of the comparator to place the first switch in an inactive mode when current through the inductor is less than or equal to zero. In yet a further embodiment, the converter further includes a logic OR gate having a first input coupled to the P-gate signal, a second input coupled to the output voltage of the comparator and an output coupled to provide the P-gate prime signal to the control gate of the first switch. In another yet further embodiment, the P-gate signal is set HIGH when current through the inductor is increasing to a peak current and LOW a portion of time when current through the inductor is decreasing from the peak current or is zero. In another yet further embodiment, the complementary N-gate signal is set LOW during an auto-zero mode of the comparator and HIGH during a compare mode of the comparator. In another further embodiment of the one embodiment, the converter further includes a third N-channel transistor; a sixth N-channel transistor; a seventh P-channel transistor; the sixth N-channel transistor having a source coupled ground, a drain coupled to a source of the third N-channel transistor, and a control gate coupled to an enable signal; the third N-channel transistor having a drain coupled to a drain of the seventh P-channel transistor and a control gate coupled to the drain of the first N-channel transistor; the seventh P-channel transistor having a source coupled to the VOUT of the converter and a control gate coupled to the drain of the seventh P-channel transistor; a fourth N-channel transistor; a fifth N-channel transistor; an eighth P-channel transistor; the fifth N-channel transistor having a source coupled to ground, a drain coupled to a source of the fourth N-channel transistor, and a control gate coupled to an enable signal; the fourth N-channel transistor having a drain coupled to a drain of the eighth P-channel transistor and a control gate coupled to the drain of the second N-channel transistor; the eighth P-channel transistor having a source coupled to the VOUT of the converter and a control gate coupled to the control gate of the seventh P-channel transistor. In yet a further embodiment of this another further embodiment, the converter further includes a current source; a ninth P-channel transistor; a tenth P-channel transistor; an eleventh P-channel transistor; a twelfth P-channel transistor; a seventh N-channel transistor; a set-reset latch having a reset input coupled to the N-gate signal, a set input coupled between the drain of the eighth P-channel transistor and the drain of the fourth N-channel transistor, and an output coupled to provide the output voltage of the comparator; a logic AND gate having a first input coupled to the output voltage of the comparator, a second input coupled to a complementary P-gate signal, and an output coupled to provide a low power signal, a complement of the low power signal is coupled to a control gates of the eleventh and twelfth P-channel transistors; the current source having one terminal coupled to ground and another terminal coupled to a drain of the ninth P-channel transistor; the ninth P-channel transistor having a control gate coupled to control gates of the first and second P-channel transistors and the drain of the ninth P-channel transistor, and a source coupled to a drain of the tenth P-channel transistor; the tenth P-channel transistor having a source coupled to the VOUT of the converter and a control gate coupled to ground; the eleventh P-channel transistor having a drain coupled to the control gates of the first, second, and ninth P-channel transistors, and a source coupled to the VOUT; the twelfth P-channel transistor having a drain coupled to the control gates of the seventh and eighth P-channel transistors, and a source coupled to the VOUT of the converter; the seventh N-channel transistor having a drain coupled to the set terminal of the set-reset latch, a source coupled to ground, and a control gate coupled to the low power signal. In another yet further embodiment of this another further embodiment, the converter includes a logic AND gate having a first input coupled to the complimentary N-gate signal, a second input coupled to a complement of the low power signal, and an output coupled to provide the enable signal.

In accordance with another embodiment, a DC-DC boost converter includes an inductor having a first terminal coupled to a coil voltage; a capacitor having a first terminal coupled to a second terminal of a switch and a second terminal coupled to ground; a comparator having a first input coupled to the coil voltage and a second input coupled to ground, the comparator including: a first diode-connected N-channel transistor; a second diode-connected N-channel transistor having a switch coupled between a drain and a control gate; a capacitor having a first terminal coupled to a control gate of the first diode-connected N-channel transistor and a second terminal coupled to the control gate of the second diode-connected N-channel transistor; a first P-channel transistor having a drain coupled to a drain of the second diode-connected N-channel transistor; a third P-channel transistor having a drain coupled to a source of the first P-channel transistor, a control gate coupled to a complementary N-gate signal and a source coupled to an output voltage of the converter; a fourth P-channel transistor having a control gate coupled to a P-gate signal, a drain coupled to the source of the first P-channel transistor and a source coupled to the coil voltage; a second P-channel transistor having a drain coupled to a drain of the second diode-connected N-channel transistor and a control gate coupled to a control gate of the first P-channel transistor; a fifth P-channel transistor having a control gate coupled to the P-gate signal, a drain coupled to a source of the second P-channel transistor and a source coupled to the VOUT; a sixth P-channel transistor having a drain coupled to the source of the second P-channel transistor, a control gate coupled to a complementary N-gate signal and a source coupled to the VOUT. In a further embodiment of the another embodiment, the converter further includes a first resistor coupled between the source of the first P-channel transistor and the drain of the fourth P-channel transistor. In a further embodiment of this another embodiment, the first and second P-channel transistors and the first and second N-channel transistors are part of a first gain stage of the comparator. In a further embodiment of the another embodiment, the converter further includes the first switch having a control terminal coupled to a P-gate prime signal, and a first terminal coupled to the coil voltage; the comparator having an inverting input coupled to the first terminal of the first switch and a non-inverting input coupled to the second terminal of the first switch. In yet a further embodiment, the P-gate prime signal is set based on an output voltage (RECT) of the comparator to place the first switch in an inactive mode when current through the inductor is less than or equal to zero. In another yet further embodiment, the complementary N-gate signal is set LOW when the converter is in an auto-zero mode and set HIGH when the converter is in a compare mode. In another further embodiment of the another embodiment, the P-gate signal is set HIGH during an auto-zero mode of the comparator and LOW during a compare mode of the comparator. In another further embodiment of the another embodiment, the converter further includes a second gain stage in the comparator including: a third N-channel transistor; a fourth N-channel transistor; a seventh P-channel transistor; and an eighth P-channel transistor; a fifth N-channel transistor having a source coupled ground, a drain coupled to a source of the fourth N-channel transistor, and a control gate coupled to an enable signal; a sixth N-channel transistor having a source coupled to ground, a drain coupled to a source of the third N-channel transistor, and a control gate coupled to the enable signal; the third N-channel transistor having a drain coupled to a drain of the seventh P-channel transistor and a control gate coupled to the drain of the first N-channel transistor; the seventh P-channel transistor having a source coupled to the VOUT and a control gate coupled to the drain of the seventh P-channel transistor; the fourth N-channel transistor having a drain coupled to a drain of the eighth P-channel transistor and a control gate coupled to the drain of the second N-channel transistor; the eighth P-channel transistor having a source coupled to the VOUT and a control gate coupled to the control gate of the seventh P-channel transistor. In yet a further embodiment of this another further embodiment, the converter further includes a current source; a ninth P-channel transistor; a tenth P-channel transistor; an eleventh P-channel transistor; a twelfth P-channel transistor; a seventh N-channel transistor; a set-reset latch having a reset input coupled to the N-gate signal, a set input coupled between the drain of the eighth P-channel transistor and the drain of the fourth N-channel transistor, and an output coupled to provide an output voltage (RECT) of the comparator; a logic gate having a first input coupled to the output voltage of the comparator, a second input coupled to a complementary P-gate signal, and an output coupled to provide a low power signal; the current source having one terminal coupled to ground and another terminal coupled to a drain of the ninth P-channel transistor; the ninth P-channel transistor having a control gate coupled to the control gates of the first and second P-channel transistors and a source coupled to a drain of the tenth P-channel transistor; the tenth P-channel transistor having a control gate coupled to ground and a source coupled to the VOUT; the eleventh P-channel transistor having a drain coupled to the control gates of the first, second, and ninth P-channel transistors; the twelfth P-channel transistor having a drain coupled to the control gates of the seventh and eighth P-channel transistors, and a source coupled to the VOUT; the seventh N-channel transistor having a drain coupled to the set terminal of the set-reset latch, and a source coupled to ground. In yet an even further embodiment, the converter further includes a logic gate having a first input coupled to the complementary N-gate signal, a second input coupled to a complement of the low power signal, and an output coupled to provide an enable signal.

What is claimed is:
1. A boost converter, comprising:
a comparator having:
a first and second N-channel transistors, a source of the first and second N-channel transistors coupled to ground, a drain of the first and second N-channel transistors coupled to a respective control gate of the first and second N-channel transistors;
a switch connected between the drain and the control gate of the second N-channel transistor and operated by a N-gate signal,
a first P-channel transistor having a drain coupled to the drain of the second N-channel transistor and a source coupled to a drain of a third P-channel transistor and a drain of a fourth P-channel transistor,
the third P-channel transistor includes a control gate coupled to a complimentary N-gate signal, and a source coupled to an output voltage of the converter,
the fourth P-channel transistor includes a control gate coupled to a P-gate signal, and a source coupled to a coil voltage,
a second P-channel transistor having a drain coupled to the drain of the first N-channel transistor and a source coupled to a drain of a fifth P-channel transistor and a drain of a sixth P-channel transistor,
the fifth P-channel transistor includes a control gate coupled to the P-gate signal, and a source coupled to the VOUT of the converter, and
the sixth P-channel transistor includes a control gate coupled to the complimentary N-gate signal, and a source coupled to the VOUT of the converter.
2. The converter of claim 1, further comprising a capacitor coupled between the control gates of the first and second N-channel transistors.
3. The converter of claim 1, further comprising a first resistor coupled between the source of the first P-channel transistor and the drain of the fourth P-channel transistor.

4. The converter of claim 1, further comprising:
an inductor having a first terminal coupled to a first node (106), the coil voltage being measurable at the first node;
a first switch having a control terminal coupled to a P-gate prime signal, a first terminal coupled to the first node, and a second terminal coupled to the VOUT;
the comparator having an inverting input coupled to the first terminal of the first switch and a non-inverting input coupled to the second terminal of the first switch;
the P-gate prime signal being set based on an output voltage of the comparator to place the first switch in an inactive mode when current through the inductor is less than or equal to zero.

5. The converter of claim 4, further comprising:
a logic OR gate having a first input coupled to the P-gate signal, a second input coupled to the output voltage of the comparator and an output coupled to provide the P-gate prime signal to the control gate of the first switch.

6. The converter of claim 4, wherein the P-gate signal is set HIGH when current through the inductor is increasing to a peak current and LOW a portion of time when current through the inductor is decreasing from the peak current or is zero.

7. The converter of claim 4, wherein the complementary N-gate signal is set LOW during an auto-zero mode of the comparator and HIGH during a compare mode of the comparator.

8. The converter of claim 1, further comprising:
a third N-channel transistor;
a sixth N-channel transistor;
a seventh P-channel transistor;
the sixth N-channel transistor having a source coupled ground, a drain coupled to a source of the third N-channel transistor, and a control gate coupled to an enable signal;
the third N-channel transistor having a drain coupled to a drain of the seventh P-channel transistor and a control gate coupled to the drain of the first N-channel transistor;
the seventh P-channel transistor having a source coupled to the VOUT of the converter and a control gate coupled to the drain of the seventh P-channel transistor;
a fourth N-channel transistor;
a fifth N-channel transistor;
an eighth P-channel transistor;
the fifth N-channel transistor having a source coupled to ground, a drain coupled to a source of the fourth N-channel transistor, and a control gate coupled to an enable signal;
the fourth N-channel transistor having a drain coupled to a drain of the eighth P-channel transistor and a control gate coupled to the drain of the second N-channel transistor;
the eighth P-channel transistor having a source coupled to the VOUT of the converter and a control gate coupled to the control gate of the seventh P-channel transistor.

9. The converter of claim 8, further comprising:
a current source;
a ninth P-channel transistor;
a tenth P-channel transistor;
an eleventh P-channel transistor;
a twelfth P-channel transistor;
a seventh N-channel transistor;
a set-reset latch having a reset input coupled to the N-gate signal, a set input coupled between the drain of the eighth P-channel transistor and the drain of the fourth N-channel transistor, and an output coupled to provide the output voltage of the comparator;
a logic AND gate having a first input coupled to the output voltage of the comparator, a second input coupled to a complementary P-gate signal, and an output coupled to provide a low power signal, a complement of the low power signal is coupled to a control gates of the eleventh and twelfth P-channel transistors;
the current source having one terminal coupled to ground and another terminal coupled to a drain of the ninth P-channel transistor;
the ninth P-channel transistor having a control gate coupled to control gates of the first and second P-channel transistors and the drain of the ninth P-channel transistor, and a source coupled to a drain of the tenth P-channel transistor;
the tenth P-channel transistor having a source coupled to the VOUT of the converter and a control gate coupled to ground;
the eleventh P-channel transistor having a drain coupled to the control gates of the first, second, and ninth P-channel transistors, and a source coupled to the VOUT;
the twelfth P-channel transistor having a drain coupled to the control gates of the seventh and eighth P-channel transistors, and a source coupled to the VOUT of the converter;
the seventh N-channel transistor having a drain coupled to the set terminal of the set-reset latch, a source coupled to ground, and a control gate coupled to the low power signal.

10. The converter of claim 9, further comprising:
a logic AND gate having a first input coupled to the complimentary N-gate signal, a second input coupled to a complement of the low power signal, and an output coupled to provide the enable signal.

11. A DC-DC boost converter comprising:
an inductor having a first terminal coupled to a coil voltage;
a capacitor having a first terminal coupled to a second terminal of a switch and a second terminal coupled to ground;
a comparator having a first input coupled to the coil voltage and a second input coupled to ground, the comparator including:
a first diode-connected N-channel transistor;
a second diode-connected N-channel transistor having a switch coupled between a drain and a control gate;
a capacitor having a first terminal coupled to a control gate of the first diode-connected N-channel transistor and a second terminal coupled to the control gate of the second diode-connected N-channel transistor;
a first P-channel transistor having a drain coupled to a drain of the second diode-connected N-channel transistor;
a third P-channel transistor having a drain coupled to a source of the first P-channel transistor, a control gate coupled to a complementary N-gate signal and a source coupled to an output voltage of the converter;
a fourth P-channel transistor having a control gate coupled to a P-gate signal, a drain coupled to the source of the first P-channel transistor and a source coupled to the coil voltage;
a second P-channel transistor having a drain coupled to a drain of the second diode-connected N-channel transistor and a control gate coupled to a control gate of the first P-channel transistor;
a fifth P-channel transistor having a control gate coupled to the P-gate signal, a drain coupled to a source of the second P-channel transistor and a source coupled to the VOUT;

a sixth P-channel transistor having a drain coupled to the source of the second P-channel transistor, a control gate coupled to a complementary N-gate signal and a source coupled to the VOUT.

12. The converter of claim 11, further comprising a first resistor coupled between the source of the first P-channel transistor and the drain of the fourth P-channel transistor.

13. The converter of claim 11, wherein the first and second P-channel transistors and the first and second N-channel transistors are part of a first gain stage of the comparator.

14. The converter of claim 11, further comprising:
the first switch having a control terminal coupled to a P-gate prime signal, and a first terminal coupled to the coil voltage;
the comparator having an inverting input coupled to the first terminal of the first switch and a non-inverting input coupled to the second terminal of the first switch.

15. The converter of claim 14, wherein the P-gate prime signal is set based on an output voltage (RECT) of the comparator to place the first switch in an inactive mode when current through the inductor is less than or equal to zero.

16. The converter of claim 14, wherein the complementary N-gate signal is set LOW when the converter is in an auto-zero mode and set HIGH when the converter is in a compare mode.

17. The converter of claim 11, wherein the P-gate signal is set HIGH during an auto-zero mode of the comparator and LOW during a compare mode of the comparator.

18. The converter of claim 11, further comprising:
a second gain stage in the comparator including:
a third N-channel transistor;
a fourth N-channel transistor;
a seventh P-channel transistor; and
an eighth P-channel transistor;
a fifth N-channel transistor having a source coupled ground, a drain coupled to a source of the fourth N-channel transistor, and a control gate coupled to an enable signal;
a sixth N-channel transistor having a source coupled to ground, a drain coupled to a source of the third N-channel transistor, and a control gate coupled to the enable signal;
the third N-channel transistor having a drain coupled to a drain of the seventh P-channel transistor and a control gate coupled to the drain of the first N-channel transistor;
the seventh P-channel transistor having a source coupled to the VOUT and a control gate coupled to the drain of the seventh P-channel transistor;
the fourth N-channel transistor having a drain coupled to a drain of the eighth P-channel transistor and a control gate coupled to the drain of the second N-channel transistor;
the eighth P-channel transistor having a source coupled to the VOUT and a control gate coupled to the control gate of the seventh P-channel transistor.

19. The converter of claim 18, further comprising:
a current source;
a ninth P-channel transistor;
a tenth P-channel transistor;
an eleventh P-channel transistor;
a twelfth P-channel transistor;
a seventh N-channel transistor;
a set-reset latch having a reset input coupled to the N-gate signal, a set input coupled between the drain of the eighth P-channel transistor and the drain of the fourth N-channel transistor, and an output coupled to provide an output voltage (RECT) of the comparator;
a logic gate having a first input coupled to the output voltage of the comparator, a second input coupled to a complementary P-gate signal, and an output coupled to provide a low power signal;
the current source having one terminal coupled to ground and another terminal coupled to a drain of the ninth P-channel transistor;
the ninth P-channel transistor having a control gate coupled to the control gates of the first and second P-channel transistors and a source coupled to a drain of the tenth P-channel transistor;
the tenth P-channel transistor having a control gate coupled to ground and a source coupled to the VOUT;
the eleventh P-channel transistor having a drain coupled to the control gates of the first, second, and ninth P-channel transistors;
the twelfth P-channel transistor having a drain coupled to the control gates of the seventh and eighth P-channel transistors, and a source coupled to the VOUT;
the seventh N-channel transistor having a drain coupled to the set terminal of the set-reset latch, and a source coupled to ground.

20. The converter of claim 19, further comprising:
a logic gate having a first input coupled to the complementary N-gate signal, a second input coupled to a complement of the low power signal, and an output coupled to provide an enable signal.

* * * * *